United States Patent [19]

Jakubowski, Jr. et al.

[11] 4,347,777
[45] Sep. 7, 1982

[54] RACK WITH COMPLIANT WEDGE ACTUATED SWAYBRACES

[75] Inventors: Thaddeus Jakubowski, Jr., Long Beach; Jess W. Lockhart, Torrance; Norman F. Robinson, Manhattan Beach, all of Calif.

[73] Assignee: McDonnell Douglas Corporation, Long Beach, Calif.

[21] Appl. No.: 194,148

[22] Filed: Oct. 6, 1980

[51] Int. Cl.³ .............................................. F41F 5/02
[52] U.S. Cl. .............................. 89/1.5 G; 244/137 R
[58] Field of Search ............... 89/1.5 G, 1.5 B, 1.5 H; 244/137 R; 294/83 R

[56] References Cited

U.S. PATENT DOCUMENTS

| | | | |
|---|---|---|---|
| 3,268,188 | 8/1966 | La Roe et al. | 294/83 R X |
| 3,677,506 | 7/1972 | La Roe | 244/137 R |
| 3,784,132 | 1/1974 | Newell | 244/137 R |
| 3,954,233 | 5/1976 | Hasquenoph et al. | 89/1.5 G |
| 4,008,645 | 2/1977 | Herbert | 244/137 R |
| 4,132,377 | 1/1979 | Schorr | 89/1.5 B X |
| 4,183,480 | 1/1980 | Jakubowski | 89/1.5 G X |

FOREIGN PATENT DOCUMENTS 2731103  1/1978  Fed. Rep. of Germany ... 244/137 R

*Primary Examiner*—David H. Brown
*Attorney, Agent, or Firm*—Paul T. Loef; George W. Finch; Donald L. Royer

[57] ABSTRACT

A store carrier having automatic sway bracing which includes two sway braces located symmetrically at a span larger than a pair of inner suspension hooks and smaller than a pair of outer suspension hooks. When a store is loaded on either the inner or outer pair of hooks and the hooks close, a pair of spring loaded tapered wedges on each side of vertically moveable sway brace supporting columns are released to slide and wedge against mating tapered surfaces on the sway brace column thereby locking the sway braces against the loaded store. The wedges are compliant in that they are spring biased against the sliding surface so as to avoid unloading the wedge when subjected to vibratory loads. The wedges are thus prevented from excessive tightening when subject to vibration. At hook opening the tapered wedges are driven with the hooks to cocked positions ready to accept the next store.

11 Claims, 16 Drawing Figures

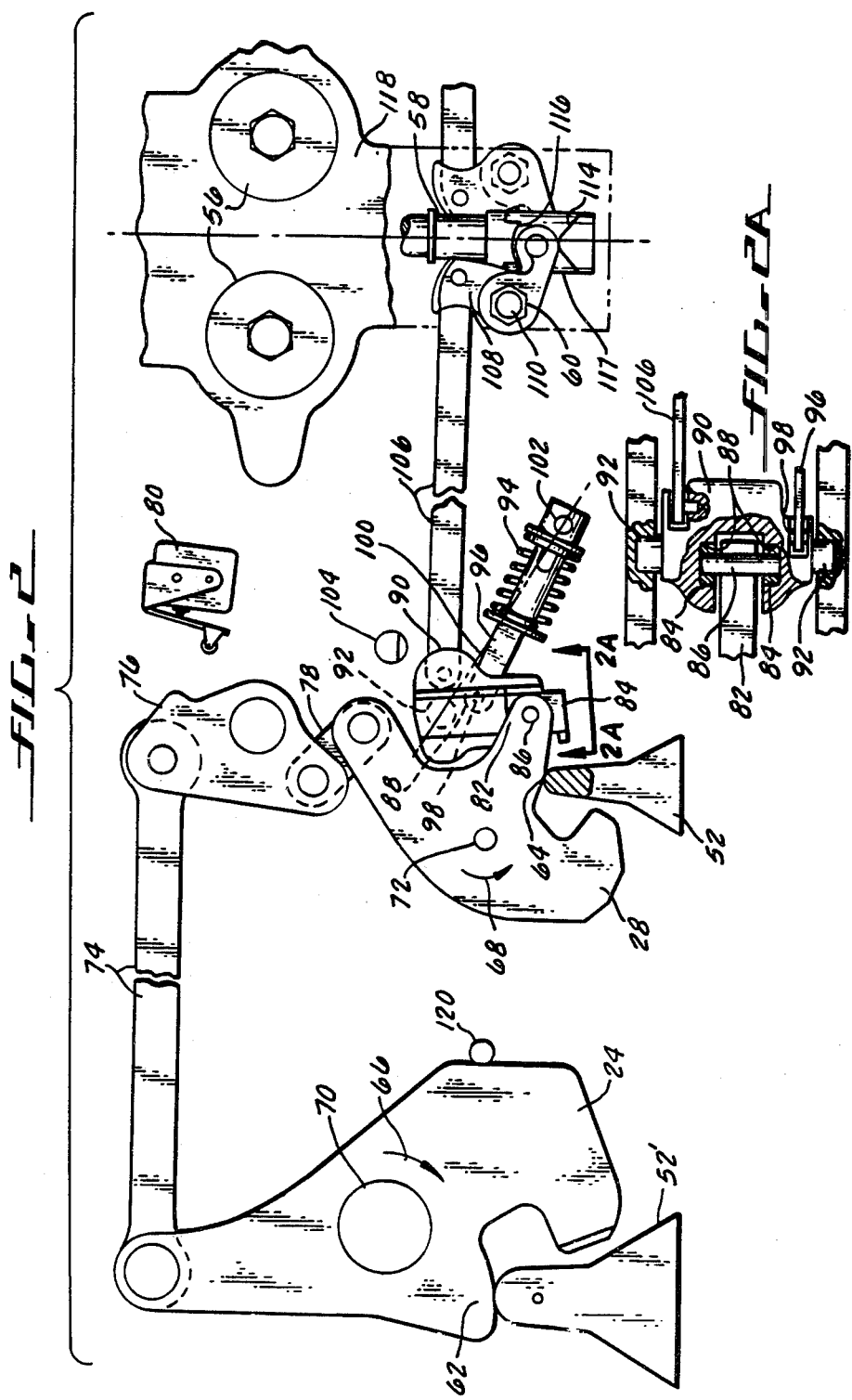

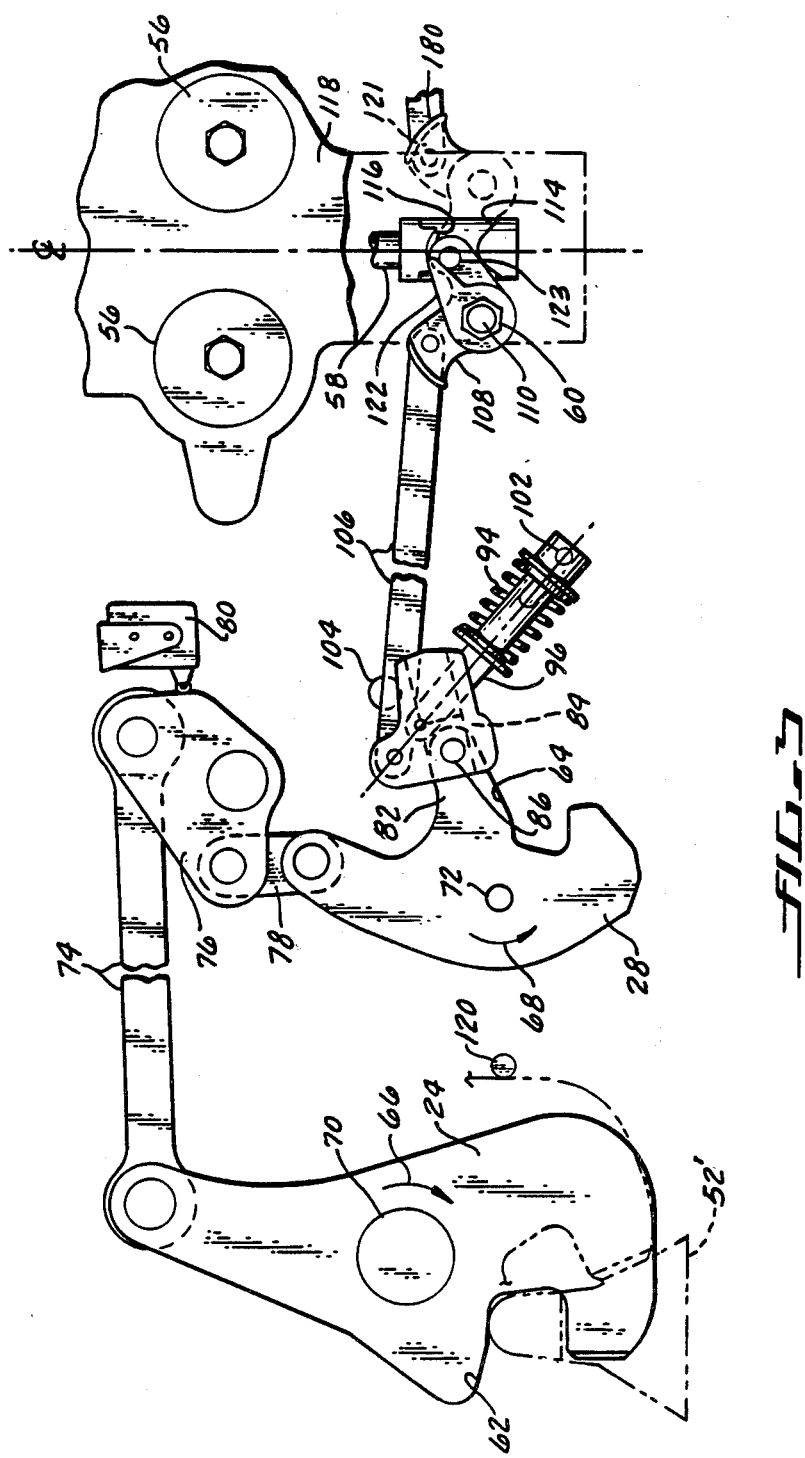

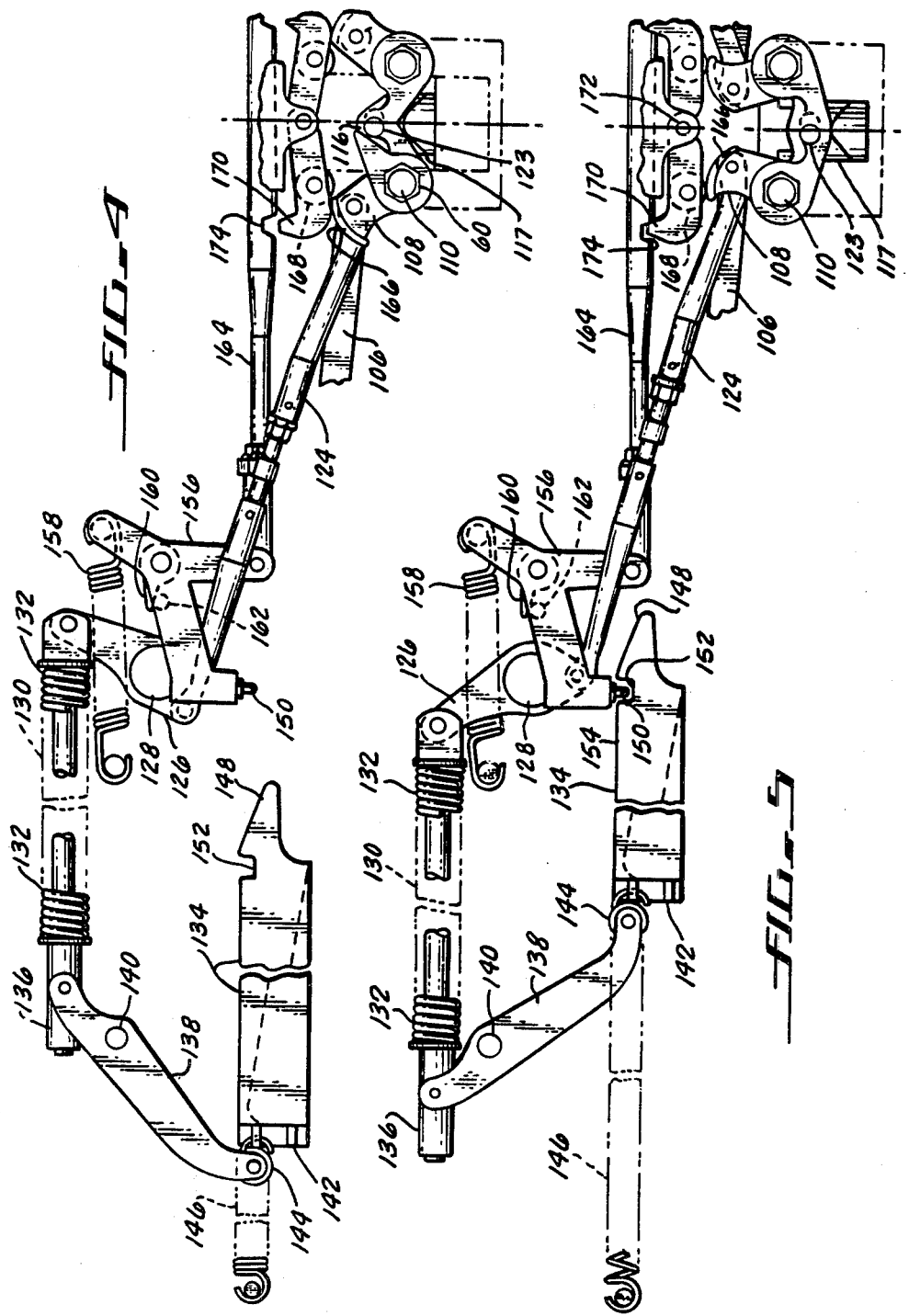

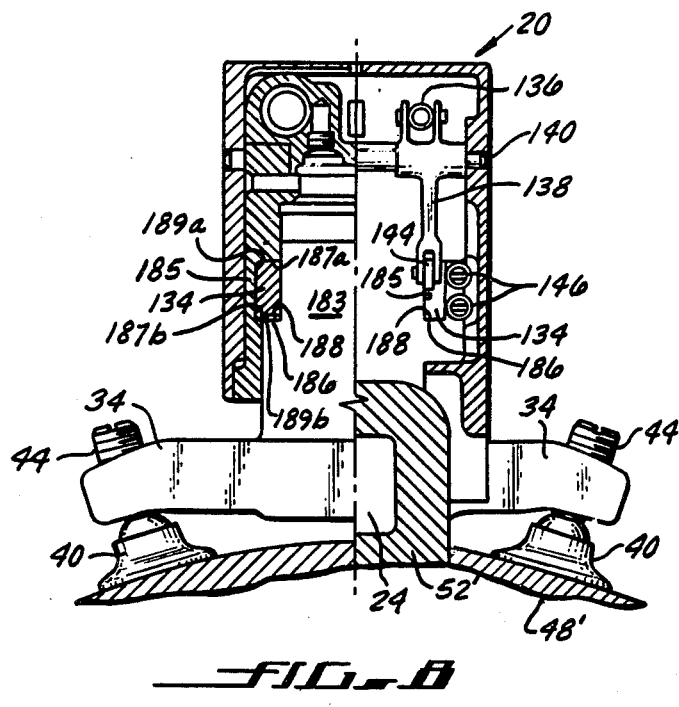
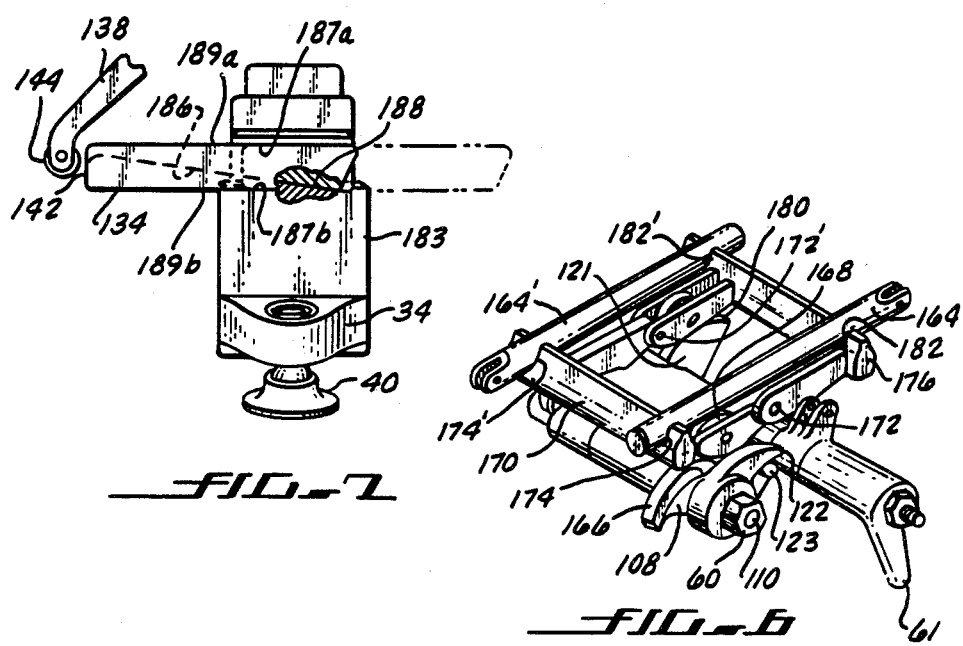

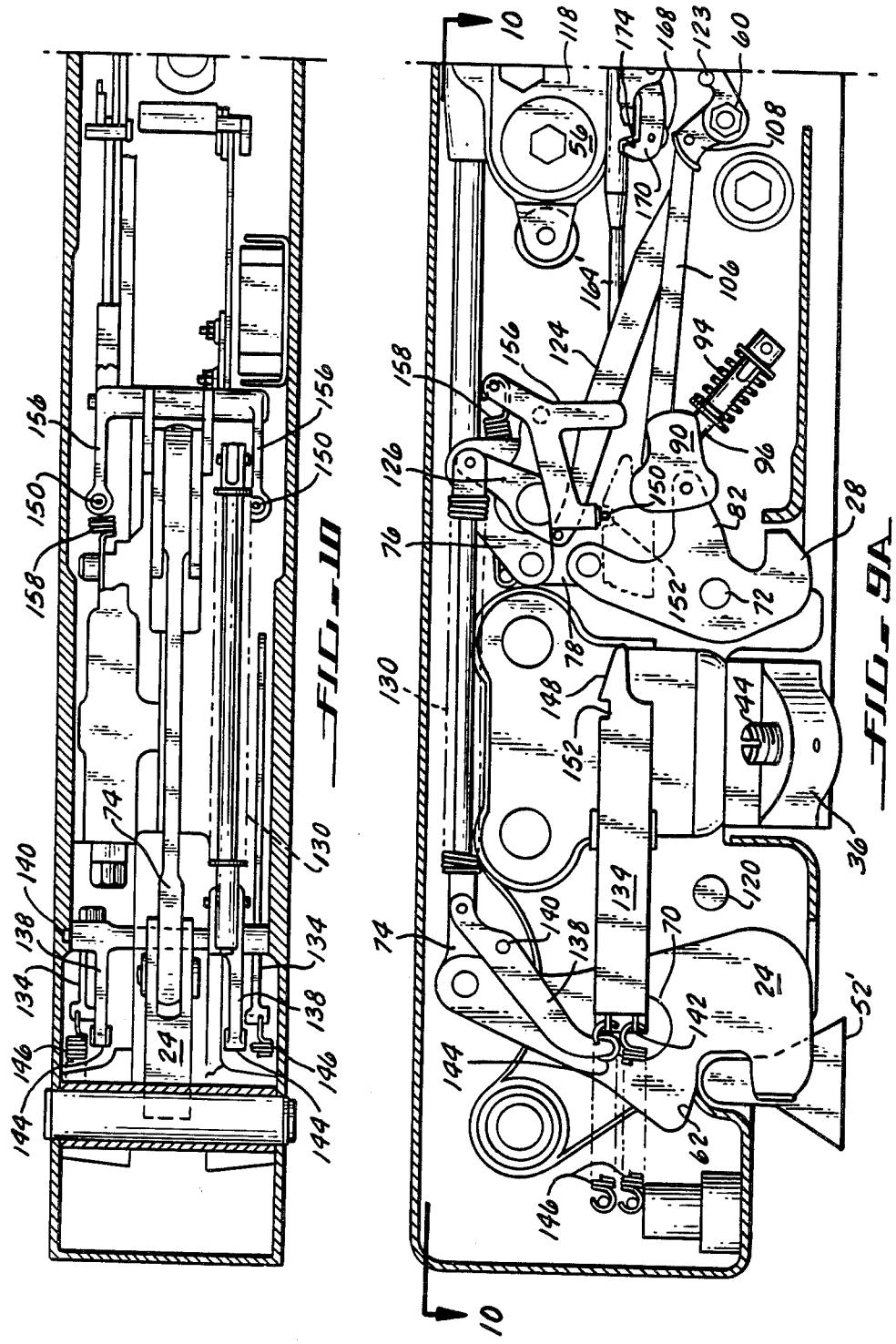

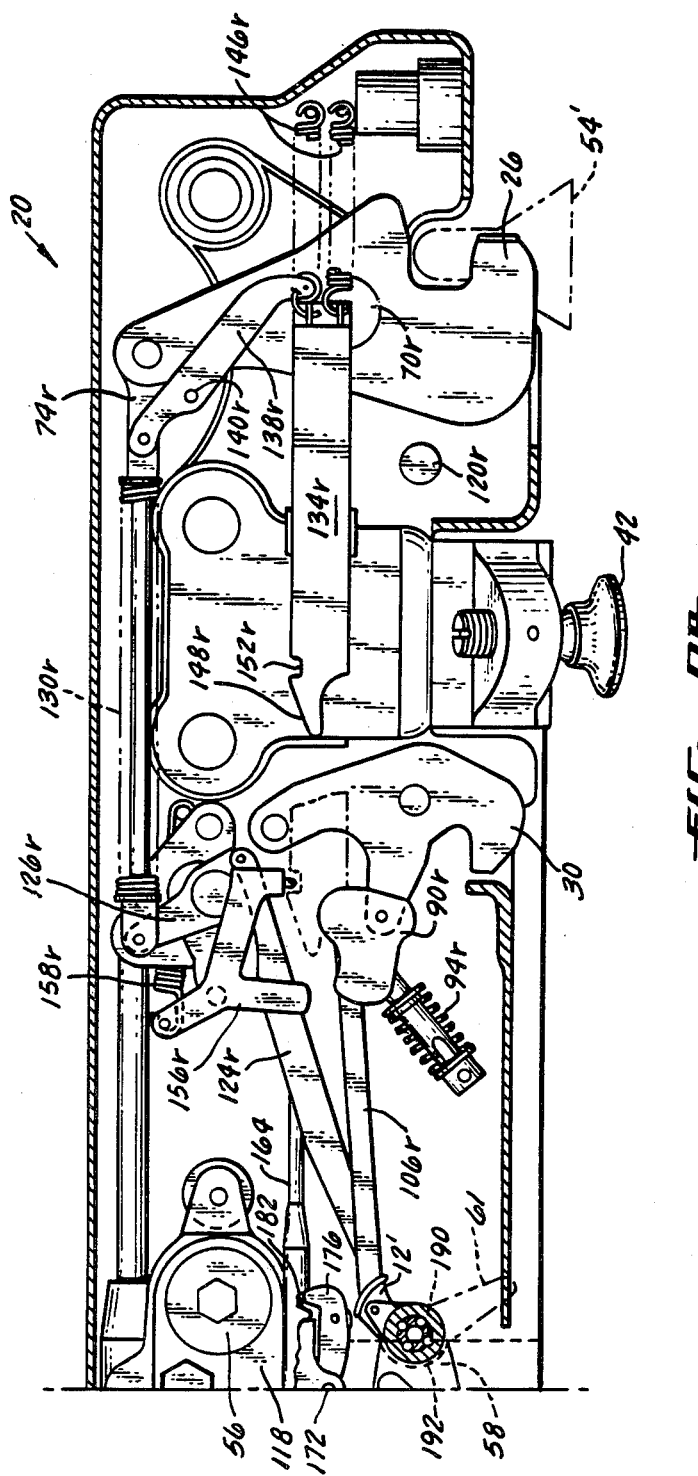

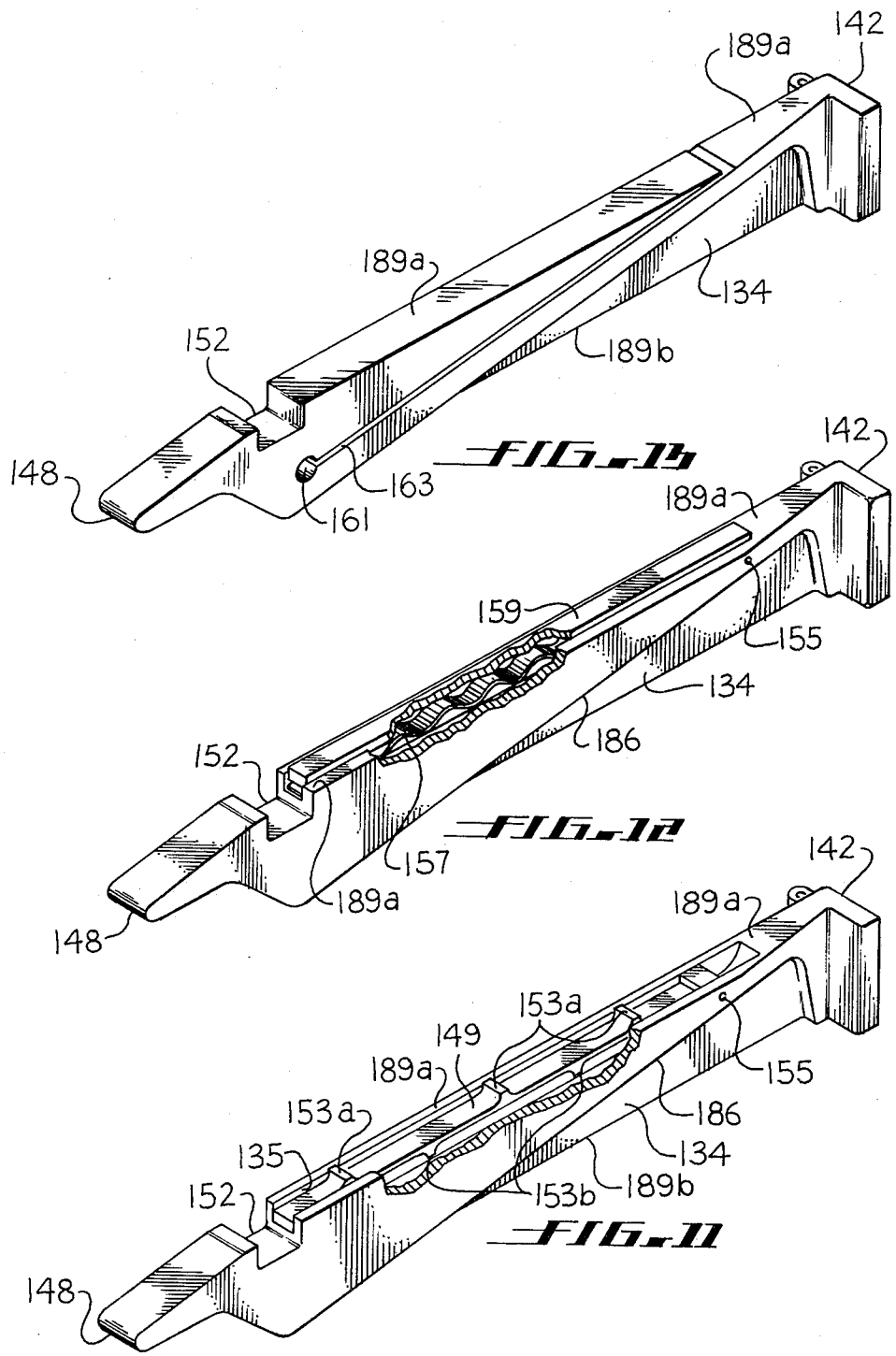

RACK WITH COMPLIANT WEDGE ACTUATED SWAYBRACES

The Government of the United States of America has rights in this invention pursuant to Contract N00019-75-C-0424 awarded by the Department of the Navy.

BACKGROUND OF THE INVENTION

Military aircraft used to dispense bombs, rockets and other stores in flight usually include racks located beneath the wings and fuselage designed to release the stores upon command. Typical racks are shown in U.S. Pat. No. 3,784,132 by NEWELL wherein the store retaining hooks are located inboard from sway bracing mechanisms which usually consist of spring-loaded plungers positioned to engage the surfaces of the loaded store. In some embodiments wedges are used to assure that the sway brace remains in proper position during high-G maneuvers of the aircraft. A typical rack having the hooks outboard of the sway braces is shown in U.S. Pat. No. 3,954,233 by HASQUENOPH, et al.

The time required to refuel and rearm a combat aircraft including the loading of stores on pylons becomes critical under many combat conditions. Therefore, it is desirable that a store rack not only operate properly when releasing a store but that the rack is easy to reload. For this reason racks with automatic sway bracing such as shown in the HASQUENOPH, et al patent have been developed. Normally, such devices require opening and closing of the hooks to hold the bombs or stores and in some instances manual positioning and fitting of the sway braces or some other adjustment when the rack is required to accommodate a store having a different support ring dimension than the previous store loaded onto the rack. If the new store has a different lug span, the rack itself must be changed. Racks with sway braces actuated by wedges which apparently engage as the hook adjacent the wedge closes are disclosed in U.S. Pat. No. 4,008,645 by HERBERT and U.S. Pat. No. 4,183,480 by JAKUBOWSKI which is assigned to the same assignee as the instant patent. Both of these references provide for biasing the wedges so as to automatically engage the sway braces. However, testing of the rack of reference 2 in a simulated flight environment while mounted on a wing structure and with the store attached caused a condition to occur within the rack which made manual removal of the store either very difficult or impossible. Further development test indicated that vibratory loads caused the wedges to load and unload in alternate fashion while the wedge was unloaded the biasing spring 146 caused the wedge to advance in the direction to increase the load imposed by the sway brace on the store. Obviously, the greater the mass of the store or the G-load caused by the environment, the greater the preload sway brace imposed against the store. The rack was particularly sensitive to a torsional vibration about the longitudinal axis of the store.

With this background, it is apparent that there has been a need to provide a store carrier which includes hooks at different spans, is easy to load and unload, and which can automatically brace stores of various sizes against lateral sway and prevent overload under vibratory loads. Such a device would shorten the time required for the loading thereof while at the same time would be able to receive a new store with either a 14 or 30 inch lug span. A 14 or 30 inch lug span has become standard in most western countries. At the same time, the device must be able to accommodate excessive loads applied to the hooks due to high G-maneuvers and the reaction forces from the sway braces.

SUMMARY OF THE INVENTION

The present invention provides a new mechanism for automatically sway bracing stores suspended by lugs from the hooks of a store carrier rack which are 14 or 30 inches apart. The rack is equipped with two automatically operating sway braces symmetrically located at an intermediate span between the two pairs of hooks required to accommodate the 14 and 30 inch store lug spacing. The sway braces, which extend laterally away from both sides of the hooks and engage the ring diameter of the store, retain their vertical positions once both hooks of the hook pair close. This motion of the sway braces is accomplished by means of a spring-loaded, tapered wedge on each side of each sway brace which when released by an interlock mechanism when both hooks are closed, slides against a mating tapered surface on the sway brace to lock the sway brace against the diameter of the loaded store. Since the tapered wedges are spring loaded, they assure automatic engagement with the store with a predetermined force to assure that the store does not move laterally with respect to the hooks in such a way that it could overstress the hooks and twist off. Further biasing means, in the nature of a high rate, low deflection spring is provided to maintain a normal force against the sliding planes of the wedge surfaces, so as to prevent unloading of the wedges during vibratory loads. The angle of the wedges is chosen to be small enough that friction between the wedge surfaces prevents movement of the wedges under load against the spring, yet large enough so that a wide variation in store diameter can be accommodated.

When the store is released by opening the hooks, the tapered locking wedges are driven to a cocked, ready position capable of accepting and sway bracing the next store which is loaded on the rack. The cocking mechanism is resiliently linked to the means which open the hooks through the incorporation of a spring bungee device to assure that any loading and friction of the sway brace tapered wedges will not adversely affect the force required to open the hooks and release the store. At the time the hook becomes fully open and the store is released, the load applied to the sway brace wedge by the store is relieved allowing the bungee spring, if collapsed, to re-extend to its regular position and act as the cocking link for the wedges. The present invention also includes the LA ROE lock mechanisms as described in U.S. Pat. No. 3,677,506 which minimizes the hook opening problems normally associated with excessive sway brace loadings.

It is therefore an object of the present invention to provide a store carrier rack with automatic sway bracing, having wedges simply and directly applied to force the sway braces against the store.

Another object is to provide a store carrier rack whose sway braces can be easily and automatically cocked.

Another object is to use wedges to increase the force available for application to a sway brace while making the locking force irreversable.

Another object is to supply a sway brace which is activated by spring applied force and friction which are easily controlled even during the harsh conditions of combat.

Yet another object is to supply a sway brace with a biasing spring, acting so as to maintain a load against the sliding surfaces of the wedges in order to prevent creeping of the wedge under vibratory loads.

These and other objects and advantages of the present invention will become apparent to those skilled in the art after considering the following detailed specification in conjunction with the accompanying drawings wherein:

BRIEF DESCRIPTION OF THE DRAWINGS

FIG. 2 is a diagrammatic front half side view of the hooks and their associated linkages with the hooks in open positions;

FIG. 2A is a partial cross-sectional underside view taken at line 2A—2A of FIG. 2 showing the details of a LA ROE cam locking and release mechanism;

FIG. 3 is a view similar to FIG. 2 with the hooks in closed positions;

FIG. 4 is a diagrammatic front half side view of the sway brace wedge latch system as it appears when the hooks are in the closed positions shown in FIG. 3;

FIG. 5 is a front half side view similar to FIG. 4 of the sway brace wedge latch system when the hooks are in the open positions shown in FIG. 2;

FIG. 6 is a perspective view of the mutual lock-out linkage which prevents the sway braces from engaging the store until both hooks of a hook pair are in the closed position;

FIG. 7 is a vertical side view of the sway brace with its wedges in bracing position.

FIG. 8 is a cross-sectional view with the left hand side thereof taken adjacent the sway brace column and the right hand side taken through a store lug;

FIGS. 9A and 9B are a cross-sectional side view of the present invention with hooks in locked positions, the outer hooks being engaged to the lugs of a store;

FIG. 10 is a cross-sectional view of the front half of the rack taken at line 10—10 of FIG. 9A.

FIG. 11 is an isometric view of the preferred embodiment of the sway brace wedge with a portion removed to show the biasing spring; and FIGS. 12 and 13 are alternative embodiments of the sway brace wedge.

DETAILED DESCRIPTION OF THE SHOWN EMBODIMENT

Figure 1A:
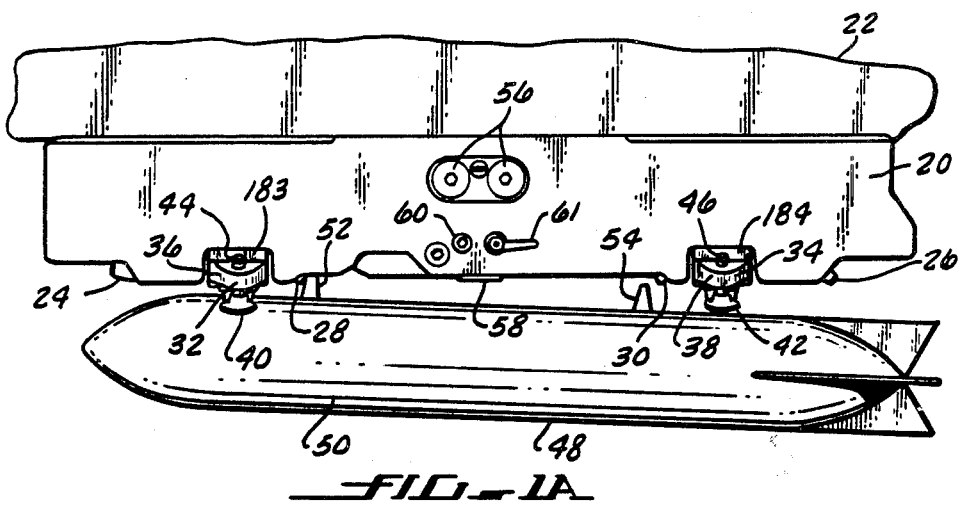
FIG. 1A is a simplified side view of the store carrier rack of the present invention with a store being loaded on the 14 inch hooks thereof.

Referring to the drawings, more particularly by reference numbers, number 20, in FIG. 1A refers to an automatic sway bracing rack constructed according to the present invention. The rack 20, which usually is connected to aircraft structure 22 includes a pair of outer hooks 24 and 26, a pair of inner hooks 28 and 30, a forward sway brace 32 positioned between the hooks 24 and 28 and a rearward sway brace 34 positioned between hooks 26 and 30. The portions of the sway braces 32 and 34 shown in FIG. 1A are fairly conventional including sway brace arms 36 and 38 which extend from both sides of the rack and support sway bracing pads 40 and 42 swivel mounted to threaded adjustment members 44 and 46 respectively.

When either hooks 24 and 26 or 28 and 30 are closed beyond their self-energizing position to retain a store 48 on the rack, the sway bracing arms 36 and 38 are forced down by means to be described hereinafter so that the pads 40 and 42 and identical structure on the opposite side of the rack 20 come in contact with the outer surface 50 of the store 48. In this manner the store 48 is forcefully retained by its lugs 52 and 54 and the hooks 28 and 30 and is prevented from rotative movement about the hooks 28 and 30 by the pads 40 and 42. The pads 40 and 42 are swivel mounted so that they can conform to store surfaces 50 of various diameters.

As can be seen in FIG. 1A, when the inner hooks 28 and 30 are employed, the sway brace pads 40 and 42 contact the store 48 outboard of the lugs 52 and 54. Therefore, if the sway brace arms 36 are wedged downwardly when hook 38 closed, the moment created on the store 48 would assist in forcing the lug 54 into the hook 30. If, however, the arms 36 and 38 descended when one hook closed, it would require that the store be elevated into the hooks 28 and 30 exactly level therewith since any other action would result in actuation of the sway brace arms 44 and 46 which would make engagement with the hooks impossible.

Figure 1B:
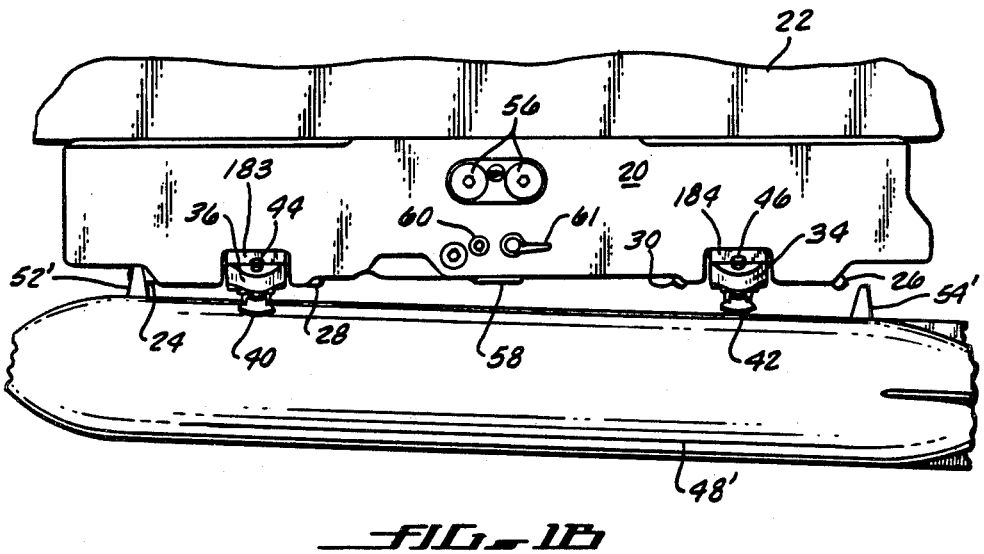
FIG. 1B is a view similar to FIG. 1A with a larger store being loaded on the 30 inch hooks.

In FIG. 1B a larger store 48' having a wider spacing of its lugs 52' and 54' is shown being attached to the outboard hooks 24 and 26 of the rack 20. In this instance should the sway brace arms 36 be activated downwardly when the hook 24 closes, a moment on the store 48' would be created which would prevent engagement of the lug 54' with a hook 26. Therefore, it should be obvious that to have a practical automatic sway bracing arrangement there must be provided means to prevent actuation of the sway braces until after both of a pair of hooks are closed enough to retain the store 48 or 48' in its proper vertical position. The other features shown in FIGS. 1A and 1B required to make a practical store carrier rack include pyrotechnic cartridge holders 56 which cartridges are used to actuate the hooks to an open position when it is desired to release the store, a piston 58 which bears against the store 48 or 48' and propels the store 48 or 48' downwardly once the hooks have opened, a manual hook opening fitting 60 which is provided to enable movement of the hooks 24, 26, 28 and 30 to open positions without actuation of the pyrotechnic cartridges or the piston 58 and a lock lever 61 used to assure that the rack is not inadvertently actuated.

FIG. 2 shows the forward half of the hook latching system. The rearward half of the system is essentially identical so only the front half will be described in detail. As the lug 52 or 52' engages the tang 62 of hook 24 or the tang 64 of the hook 28, it tends to rotate the hooks in the directions of arrows 66 and 68 about pivots 70 and 72. The motion of the hooks 24 and 28 is in unison no matter which is being loaded since they are coupled by rod 74, crank 76 and link 78. A hook position sensing switch 80 is provided adjacent the crank 76 and is actuated thereby when the hooks 24 and 28 close.

Hook 28 includes a rearwardly extending arm 82 which is connected to cam followers 84 by a pivot 86. As shown in FIG. 2A, the cam followers 84 slide in facing linear cam slots 88 as the cam member 90 in which the slots 88 are formed, rotates about pivots 92. The member 90 is biased to the position shown in FIG. 2 or to the position thereof shown in FIG. 3 by means of a preloaded spring 94 whose force is connected to the member 90 by means of a rod 96 and a pivot 98 so that it forms an overcenter device for the member 90. The aforementioned briefly describes the LA ROE lock mechanism whose detailed description and operation can be found in U.S. Pat. No. 3,677,506. The LA ROE lock mechanism is advantageous because it can be constructed to carry excessive loads without impairing its ability to release those loads such as those applied to the hooks 24 and 28. Yet, it can tolerate linkage inaccuracies so that it is reliable in the harsh environment of combat.

The LA ROE lock mechanism self energizes at about 35 degrees of travel of member 90, that is, the lug being pushed up against the hook tang 62 or 64 has the effect of forcefully compressing spring 94 until the pivot 88 moves past the center line 100 between pivot 94 and the outermost pivot 102 of the spring 94. At this point, the spring 94 takes over, producing a torque that rotates the cam member 90 to the position shown in FIG. 3 which close the hooks. The motion of the cam member 90 is restricted in such counterclockwise movement by means of cam stop 104 which engages member 90 when it has rotated the desired amount. Of course, the motion of hook 28 is transferred to hook 24 so that both hooks close together. The closing of the hooks 24 and 28 is mechanically linked by means of a release rod 106 to a release lever 108 which is mounted for rotation about pivot 110 and whose actuation arm 112 engages cam surfaces 114 and 116 connected to the main breach piston 58 by means of a sliding sleeve. The breach piston 58 is spring loaded upwardly to return to its up position once the gas from the pyrotechnic cartridges bleeds off. The cam surface 116, however, is forced upwardly by the actuation arm 112 so that upon the loading of pyrotechnic charges into the breach mechanism 118 the rack 20 can be explosively energized.

FIG. 3 represents the forward half of the bomb rack 20 in a loaded condition. Upon firing of the pyrotechnic cartridges, the piston 58 is forceably propelled downwardly to eject the store and at the same time, the downward motion is transferred by means of the release lever 108 and rod 106 to the cam member 90 which rotates in a clockwise direction to open the hooks 24 and 28, which release the lug 52' or 52 by rotating opposite to the arrows 66 and 68 until the hook 24 strikes stop 120. The action of stop 120 also prevents further rotation of the member 90 and further movement of the connecting linkage. A rearward release lever 121 essentially identical to lever 108 also is activated at this time so that the rearward hooks 26 and 30 also open. The rear release lever 121 is forced to rotate by a cam similar to 116 but the lever 121 is not connected to lever 108 so that upon loading of the stores the forward or rearward hooks can be closed independently. The hooks can also be opened manually by twisting the fitting 60 clockwise. When this is done, a lever 122 connected thereto moves into contact with a projection 123 on the release lever 108 to rotate it clockwise which moves the cam surfaces 114 and 116 downwardly through contact with cam surface 114. Thereafter, the rack 20 operates as if it had been pyrotechnically actuated.

FIG. 4 shows the forward portion of the automatic sway brace mechanism as it appears prior to store release, and FIG. 5 shows the mechanism after store release. As aforesaid, the store release is initiated by a downward movement of the cam surface 116 against the lever 108 to rotate it in a clockwise direction. Rotation of the release lever 108 pulls a rod 124 which is connected between the release lever 108 and a lever 126 which is rotatable about pivot 128. A bungee assembly 130 is connected to the opposite end of lever 126 and rotation of the lever 126 in a counterclockwise direction caused by pulling of the rod 124 causes a preloaded spring 132 in the bungee assembly to compress until further movement of lever 108 releases the hooks 24, 26, 28, and 30. Wedges 134 are operatively connected to the opposite end 136 of the plunger assembly 130 by means of a twin crank 138 which rotates counterclockwise about pivot 140 and contacts the ends 142 of the wedges 134 by means of rollers 144. The wedges 134 are biased against the rollers 144 by means of springs 146 so that the wedges 134 tend to remain in the wedging position shown in FIG. 4 until forcefully moved by rotation of the crank 138 to the cocked positions shown in FIG. 5.

As the wedges 134 move to the positions shown in FIG. 5, ramps 148 on the ends thereof strike and compress plungers 150 until the plungers 150 fall into detent slots 152 formed in the upper surfaces 154 of the wedges 134. The plungers 150 are mounted on a crank 156 and thereafter hold the wedges 134 in the position shown in FIG. 5 until the crank 156 rotates even when the release lever 108 rotates to remove the cocking force applied to the wedges 134 by the rollers 144. The crank 156 is biased to the position shown in FIGS. 4 and 5 by means of a spring 158 which retains the crank 156 with its secondary lever arm 160 against a stop 162. The force required to rotate the crank 156 against the spring 158 is provided by means of the spring 146. The spring acts through the wedges 134 and the detents 152 to the plungers 150 to rotate the crank 156 clockwise when allowed to do so by release of the locking rod 164 connected thereto and the relief of force applied by the twin crank 138.

With the hooks open, the mechanism is in the position shown in FIG. 5. The upper cam surface 166 of the release lever 108 is in contact with a roller 168 which is connected to a pawl 170 mounted for rotation about pivot 172. The cam surface 166 forces the pawl 170 into engagement with cutouts 174 and 174' in the locking rods 164 and 164' (FIG. 6). The engagement of the pawl 170 with the cutouts 174 and 174' holds the locking rods 164 and 164' and thereby prevents clockwise rotation of the crank 156 to which the rod 164 is connected. A similar crank 156' in the rearward half of the rack 20 connects with rod 164'. This locks the wedges 134 in the non-wedging positions shown in FIG. 5. During closure of the front hooks 24 and 28, the lever 108 rotates and during the last segment of its travel, its cam surface 166 no longer blocks the pawl 170 upwardly into the cutouts 174 and 174'. This blockage removal occurs after the self-energizing point of the LA ROE mechanism is reached but the rods 164 and 164' are not released until the rear hook controlling LA ROE mechanism is past the self energizing point. The second locking rod 164' provides the identical locking function to the rearward portion of rack 20 as rod 164 does to the forward portion. As can be seen in FIG. 6, a second pawl 176 is mounted for rotation about a pivot 172' aligned with pivot 172. The pawl 176 includes a roller 178 which is engaged by the upper surface 180 of the rear release lever 121. Lever 121 does not disengage the roller 178 and the pawl 176 from cutouts 182 and 182' in rods 164 and 164' until the rear LA ROE lock mechanism has gone over center to move pawl 176 out of its blocking position. Therefore, it should be apparent that the blockage under both forward and aft pawls 170 and 176 must be removed by rotation of the forward and rear release levers 108 and 122 before the rods 164 and 164' are free to move and release the wedges 134.

Once the store has been locked into both the forward and rear hooks, the wedges 134 are released by movement of the rods 164 and 164'. The wedges 134 are located on the opposite sides of the sway brace columns 183 and 184 on which the sway brace arms 36 and 34 are mounted. That is, the wedges 134 are located on the opposite sides of the sway brace columns 183 and 184 on which the sway brace arms 36 and 34 are mounted. A detailed configuration of the preferred embodiment of the wedge 134 is shown in FIG. 11 with alternate embodiments in FIGS. 12 and 13. The sway brace wedges are shown in FIGS. 1-10 as solid, i.e. without the biasing spring as these figures are intended to show the over-all function of the bomb rack. Further, the scale of these views is such that little detail shows and was deemed to cause more confusion than benefit. However, in all embodiments, a spring means is located in the upper surface 189a so as to bias the sliding surfaces 186 and 188 into engagement. Biasing spring means is necessary to maintain a substantial force between the engaging surfaces 186 and 188 when the store 48 is subjected to a vibratory environment as discussed infra (see Background of Invention). In all three alternative embodiments, the spring means is shown in the upper surface 189a of the wedge 134. However, the biasing means could be located anywhere in the load path between the rack 20 and the pads 40 and 42. In fact, the sway braces 32 and 34 could be designed to provide a suitable spring rate and preloaded by proper adjustment of the threaded adjustment members 44 and 46. At any rate, FIG. 11 shows a wedge 134 with a longitudinal cavity 135 which contains a spring beam 149. The spring beam 149 has alternately spaced column supports on both sides of the beam as shown at 153a and 153b. A pin 155 holds the beam spring 149 in place. Short columns 153a engage the surface 187a of the slot 185 in the column 183 and when loaded deform the beam 149 as the load is reacted by the opposing short columns 153b so that the beam behaves as a spring with a high spring rate. The alternate embodiment shown at FIG. 12 employs a bearing strip 159 which is pinned at 155 to the wedge 134 and covers a wave spring 157. Compression of the wave spring 157 provides a suitable biasing means to maintain engagement of the surface 186 with the surface 188. The embodiment of FIG. 13 shows a wedge 134 having a slot 163 which begins at the surface 189a and terminates at a small bore 161 to provide a cantilevered beam which deflects under load to provide a biasing means between the same surfaces 186 and 188. As can be seen inf FIGS. 7 and 8 the wedging surfaces 186 of the wedges 134 engage mating wedge surfaces 188 on the column 183 so that movement of the wedges 134 to the left in FIG. 7 forces the column 183 downwardly. The resultant load generated by the wedging action is transferred to the rack 20 by means of slots 185 whose upper and lower surfaces 187a and 187b engage surfaces 153a, 159 or 189a (depending on the embodiment) and 189b on the top and bottom of the wedges 134. Column 184 is similar so that the pads 40 and 42 forcefully come in contact with the store 48 or 48' to prevent its swaying about the hooks. A side view and top view of the front half of the above described mechanisms as they fit together in the compact bomb rack is shown in FIGS. 9A and 10. It should be realized that the rearward portion of the rack 20 is in essence a mirror image of the forward portion and operates accordingly. In FIG. 9B which shows the rearward portion of the rack 20, the corresponding parts not otherwise numbered are numbered with the same numbers as those parts described above with an "r" added thereto.

The lock lever 61 is connected to a half shaft 190 which when in the position shown in FIG. 9B clears a cutout 192 in the piston 58. When rotated 60 degrees, the shaft 190 interferes with the cutout 192 and prevents movement of the piston 58 to thereby lock the rack 20. Suitable spring detents (not shown) are provided for the shaft 190 so that it has two stable positions, one locking and the other unlocking the rack 20.

Thus, there has been shown and described a novel store carrier with spring loaded, compliant wedge activated sway braces which fulfills all the objects and advantages sought therefor. Many changes, modifications, variations and other uses and applications of the subject invention will, however, become apparent to those skilled in the art after considering the foregoing specification together with the accompanying drawings and claims. All such changes, modifications, variations and other uses and applications which do not depart from the spirit or scope of the invention are deemed to be covered by the invention which is limited only the claims which follow.

We claim:

1. A store carrier including at least one pair of hooks for retaining a store to said carrier, means to actuate said at least one pair of hooks, and sway brace means positioned to engage the store when retained by said at least one pair of hooks, said sway brace means including:
   at least one brace column moveable toward and away from a store retained by said at least one pair of hooks;
   means for engagement with a store retained by said at least one pair of hooks connected to said at least one brace column;
   at least one longitudinal slot adjacent said at least one brace column, said at least one longitudinal slot having upper and lower parallel surfaces;
   at least one ramp surface facing away from a store retained by said at least one pair of hooks;
   at least one wedge positioned for sliding engagement with said at least one ramp surface to force said at least one brace column toward a store retained by said at least one pair of hooks, said at least one wedge including parallel upper and lower surfaces which mate with said upper and lower surfaces of said at least one longitudinal slot for sliding contact therewith;
   first bias means connected between said at least one wedge and said store carrier tending to force said at least one wedge to positions to force said at least one brace column toward a store retained by said at least one pair of hooks; and
   second bias means acting in the load path between said store carrier and said means for engagement with a store tending to pre-load said at least one wedge into engagement with said at least one ramp surface whereby said means for engagement are forced into engagement to brace a store retained by said at least one pair of hooks against lateral sway about said at least one pair of hooks and maintain said engagement in a vibratory environment.

2. The store carrier defined in claim 1 further including a store carrier body wherein said first bias means is a tension spring connected between said at least one wedge and said store carrier body.

3. The store carrier defined in claim 1 wherein said at least one wedge includes a wedge surface formed adjacent said lower surface of said at least one wedge, said wedge surface being angled and positioned to engage said at least one ramp surface to wedge said at least one ramp surface which is connected to at least one brace column toward a store retained by said at least one pair of hooks.

4. The store carrier defined in claim 3 including pawl means positioned for engagement with said at least one wedge to controllably retain said at least one brace column away from a store retained by said at least one pair of hooks.

5. The store carrier defined in claim 1 wherein said second bias means is a spring acting between said upper parallel surface of said at least one longitudinal slot adjacent said at least one brace column and said upper parallel surface of said at least one wedge.

6. The store carrier defined in claim 5 wherein said spring is a beam spring.

7. The store carrier defined in claim 5 wherein said spring is a wave spring.

8. The store carrier defined in claim 5 wherein said spring is a cantilever beam formed by slotting said wedge parallel to and above said wedge surface engaging said at least one ramp surface.

9. A store carrier including at least one pair of hooks for retaining a store to said store carrier, means to actuate said at least one pair of hooks, and sway brace means positioned to engage a store when retained by said at least one pair of hooks, said sway brace means including:
- a first brace column having opposite sides and being moveable toward and away from a store retained on said at least one pair of hooks;
- means for engagement with a loaded store connected to said first brace column;
- at least one ramp surface facing away from a store retained on said at least one pair of hooks;
- a first pair of longitudinal slots adjacent said first brace column, each being located on said opposite sides thereof, said first pair of longitudinal slots each having upper and lower side surfaces;
- a first pair of wedges, each wedge of said pair of wedges having parallel upper and lower surfaces which mate with said upper and lower surfaces of said first pair of longitudinal slots for sliding contact therewith and a wedge surface positioned adjacent said lower surface of said wedge, said wedge surfaces of said pair of wedges being angled and positioned to engage said ramp surfaces to wedge said ramp surfaces and said first brace column toward a store retained on said at least one pair of hooks,
- a first pair of engagement bias means, each engagement bias means connected between each of said first pair of wedges and said store carrier tending to force said first pair of wedges to positions to force said first brace column toward a store retained by said at least one pair of hooks; and
- a first pair of load bias means, each load bias means of said first pair of load bias means acting between said means for engagement with a loaded store, through one of said ramp surfaces and one of said pair of wedges, and said store carrier so as to preload said one of said ramp surfaces into engagement with said one of said pair of wedges, whereby said means for engagement are forced into engagement to brace a store retained on said at least one pair of hooks against lateral sway about said at least one pair of hooks and maintain said engagement in a vibratory environment.

10. The store carrier defined in claim 9 including a second brace column moveable toward and away from a store retained on said at least one pair of hooks and including store engagement means thereon, one of said brace columns being adjacent each of said hooks of said at least one pair of hooks.

11. The store carrier defined in claim 10 wherein said store carrier includes:
- a second pair of longitudinal slots adjacent said second column similar to said first pair of longitudinal slots;
- a second pair of wedges similar to said first pair of wedges operatively connected to controllably force said engagement means against a store retained on said at least one pair of hooks;
- a second pair of engagement bias means similar to said first pair of engagement bias means operatively connected to controllably force said engagement means against a store retained on said at least one pair of hooks; and
- a second pair of load bias means similar to said first pair of load bias means operatively installed to maintain a pre-load between said second pair of wedges and said ramp surfaces.

* * * * *